United States Patent
Bakke et al.

(10) Patent No.: US 6,530,003 B2
(45) Date of Patent: Mar. 4, 2003

(54) METHOD AND SYSTEM FOR MAINTAINING DATA COHERENCY IN A DUAL INPUT/OUTPUT ADAPTER UTILIZING CLUSTERED ADAPTERS

(75) Inventors: Brian Eric Bakke, Rochester, MN (US); Carl Edward Forhan, Rochester, MN (US); Robert Edward Galbraith, Rochester, MN (US); Jessica Gisi, Rochester, MN (US); Frederic Lawrence Huss, Rochester, MN (US); Daniel Frank Moertl, Rochester, MN (US); Douglas David Prigge, Kenyon, MN (US); Paul Gary Reuland, Rochester, MN (US); Timothy Jerry Schimke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/916,022

(22) Filed: Jul. 26, 2001

(65) Prior Publication Data

US 2003/0023808 A1 Jan. 30, 2003

(51) Int. Cl.$^7$ .......................... G06F 11/20; G06F 12/16
(52) U.S. Cl. ........................ 711/162; 711/118; 711/112; 711/113; 714/6; 707/204
(58) Field of Search ................................. 711/162, 112, 711/113, 118, 129, 170; 707/204; 714/6, 12

(56) References Cited

U.S. PATENT DOCUMENTS

| | | | |
|---|---|---|---|
| 6,026,471 A | * | 2/2000 | Goodnow et al. .......... 711/118 |
| 6,105,116 A | * | 8/2000 | Mori .......................... 711/113 |
| 6,170,037 B1 | * | 1/2001 | Blumenau .................... 360/15 |
| 6,192,450 B1 | * | 2/2001 | Bauman et al. ............. 711/133 |
| 6,434,681 B1 | * | 8/2002 | Armangau .................. 711/162 |
| 2002/0133735 A1 | * | 1/2001 | McKean et al. ................ 714/5 |
| 2002/0133511 A1 | * | 3/2001 | Hostetter et al. ........... 707/204 |
| 2002/0083366 A1 | * | 11/2001 | Ohran ......................... 714/13 |

* cited by examiner

*Primary Examiner*—Hong Kim
(74) *Attorney, Agent, or Firm*—Bracewell & Patterson L (57) ABSTRACT

A method for maintaining data coherency in a dual Input/Output(I/O) adapter having primary and secondary adapters, wherein each of the primary and secondary adapters includes resident write cache data and directory storage devices. The method includes utilizing a split point to separate each of the cache data and directory storage devices into first and second regions, wherein the first regions contain the primary adapter cache data and directory information and the second regions contain the secondary adapter cache data and directory information. Information stored in the primary adapter cache data and directory storage devices is mirrored into the secondary adapter cache data and directory storage devices or, alternatively, information stored in the secondary adapter cache data and directory storage devices is mirrored into the primary adapter cache data and directory storage devices utilizing a dedicated communication link, such as a high-speed serial bus, between the primary and secondary adapters.

41 Claims, 9 Drawing Sheets

METHOD AND SYSTEM FOR MAINTAINING DATA COHERENCY IN A DUAL INPUT/OUTPUT ADAPTER UTILIZING CLUSTERED ADAPTERS

BACKGROUND OF THE INVENTION

1. Technical Field

The present invention relates in general to input/output (I/O) devices and, in particular, to I/O storage adapters. More particularly, the present invention relates to a method for maintaining data coherency in a dual storage adapter that utilizes clustered I/O adapters.

2. Description of the Related Art

Business use of computer systems has increased dramatically over the last half century. The use of the computer has also evolved and in today's business environment, more and more customers are becoming critically dependent on their information technology resources. As a result, they demand that these resources are always available. Any outage affecting their information technology resources has serious business implications including lost revenue and lost business. At the extreme, an extended system outage can cause a business to be permanently closed. Furthermore, the cost of one hour of system downtime can range from tens of thousands of dollars to several million dollars, depending on the nature of the business. Therefore, users require that their system services be continuously available, that is that the services be available 24 hours a day, 365 days a year. Technology that supports increased computer system availability has become critical to many businesses.

A key technology that enables systems to provide continuous availability is clustering. A cluster is a collection of one or more complete systems that operate together to provide a single, unified computing capability. The perspective from the end user is that the cluster operates as though it were a single system. Work can be distributed across multiple systems in the cluster and any single outage, planned or unplanned, in the cluster will not disrupt the services provided to the end user. The end user services can be relocated from system to system within the cluster in a relatively transparent fashion.

For computer systems, reliability is a measure of unexpected failures and availability is a measure of system downtime; the lower the downtime, the higher the availability. One can draw a relationship between reliability and availability, of course, because unexpected software and hardware failures are one cause of downtime. Thus, with all other factors being equal, a system with high reliability will also have high availability. To achieve continuous availability, more than just robust system availability is needed. Critical data and critical applications must also be resilient to outages and both must be accessible across the cluster even when the normal hosting system for the resource fails. A complete solution is achieved when the critical data and the critical applications are made to be resilient resources and are always available. Data resilience ensures that a copy of the data is always accessible to end users of the cluster while application resilience ensures that the services provided by the application are always accessible to end users of the cluster.

Input/output (I/O) storage adapters are interfaces between a computing system and a storage subsystem. In a high availability configuration, such as a cluster, redundant adapters are utilized to provide the necessary reliability, in the event that when a primary adapter fails, the backup adapter can takeover ensuring continued operation. When employing storage adapters that have resident write caches, the write cache data and directory information must be kept in synch, i.e., the cache data and directory information in the primary and backup adapters must mirror each other, to ensure a "flawless" takeover in the event of a failure in the primary adapter to maintain data resiliency.

Accordingly, what is needed in the art is method and system for maintaining data coherency between two clustered adapters.

SUMMARY OF THE INVENTION

A method for maintaining data coherency in a dual Input/Output(I/O) adapter having primary and secondary adapters, wherein each of the primary and secondary adapters includes resident write cache data and directory storage devices is disclosed. The method includes utilizing a split point to separate each of the cache data and directory storage devices into first and second regions, wherein the first regions in the primary adapter cache data and directory storage devices contain the primary adapter cache data and directory information, respectively, and the second regions in the primary adapter cache data and directory storage devices contain the secondary adapter cache data and directory information, respectively. In an advantageous embodiment, the first and second regions are substantially identical in size. Information stored in the primary adapter cache data and directory storage devices is mirrored into the secondary adapter cache data and directory storage devices or, alternatively, information stored in the secondary adapter cache data and directory storage devices is mirrored into the primary adapter cache data and directory storage devices utilizing a dedicated communication link, such as a high-speed serial bus, between the primary and secondary adapters. The first regions in the secondary adapter cache data and directory storage devices contain the primary adapter cache data and directory information, respectively, and the second regions in the secondary adapter cache data and directory storage devices contain the secondary adapter cache data and directory information, respectively.

The present invention discloses a novel method for maintaining data coherency between a primary adapter and its secondary, or backup, adapter. The primary and secondary adapters of the present invention provide mutual backup of their write cache for one another. Furthermore, the write cache storage of the adapters can be split, in advantageous embodiments, asymmetrically utilizing split points to meet functional or performance requirements. For example, if one adapter is controlling ten disk drives and the other adapter is controlling five disk drives, the first adapter could be allocated ⅔ of the write cache to maintain consistent performance. In the event that one adapter is not being utilized to backup another adapter, or if the other adapter has failed, then the entire size of the write cache can be dedicated to the one adapter.

In another embodiment of the present invention, the method also includes writing correlation data to the primary and secondary adapters nonvolatile memory devices. In a preferred embodiment, the correlation data includes the primary and secondary adapters unique identifiers, a flag indicating that the primary adapter's nonvolatile write cache data has been mirrored to the secondary adapter, and the primary and secondary adapters cache data and directory split point information. In a related embodiment, the flag is a single bit that is set when the primary adapter's write cache data has been mirrored to the secondary adapter and the unique identifiers are world-wide unique identifiers of the primary and secondary adapters.

In another aspect of the present invention, a method for synchronizing primary and secondary Input/Output (I/O) adapters in a dual storage adapter having a dedicated communication link between the primary and secondary adapters is disclosed. The method includes determining if the dedicated communication link is operational and the primary and secondary adapters are compatible. Next, the method determines if split points in the primary and secondary cache data and directory memory devices match in response to a determination that the dedicated communication link is operational and the primary and secondary adapters are compatible. The method will indicate that an abnormal configuration has been encountered if either the dedicated communication link is non-operational or the primary and secondary adapters are not compatible. A small/medium primary to secondary re-synchronization operation is performed in response to a determination that the split points matches. In the event that the split points do not match, a large primary to secondary re-synchronization operation is performed instead.

Performing a small/medium primary to secondary re-synchronization operation, in an advantageous embodiment, includes determining if the sequence numbers, located in the correlation data associated with the primary and secondary adapter, matches. If the sequence number matches, a small primary to secondary re-synchronization operation is performed, otherwise a medium primary to secondary re-synchronization operation is executed instead. In a related embodiment, performing a small primary to secondary re-synchronization operation includes copying information in the primary adapter's cache directory to the secondary adapter's cache directory and performing a medium primary to secondary re-synchronization operation includes copying information in the primary adapter's cache directory and cache data store to the secondary adapter.

A large primary to secondary re-synchronization operation includes changing the correlation data associated with the primary and secondary adapters. Next, the re-synchronization operation determines if primary to secondary mirroring is enabled and if so, changing the split points on the primary and secondary adapters. Following which, the re-synchronization operation again determines if mirroring between the primary and secondary adapters is enabled and performing a medium re-synchronization operation in response to a determination that mirroring has not been enabled.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
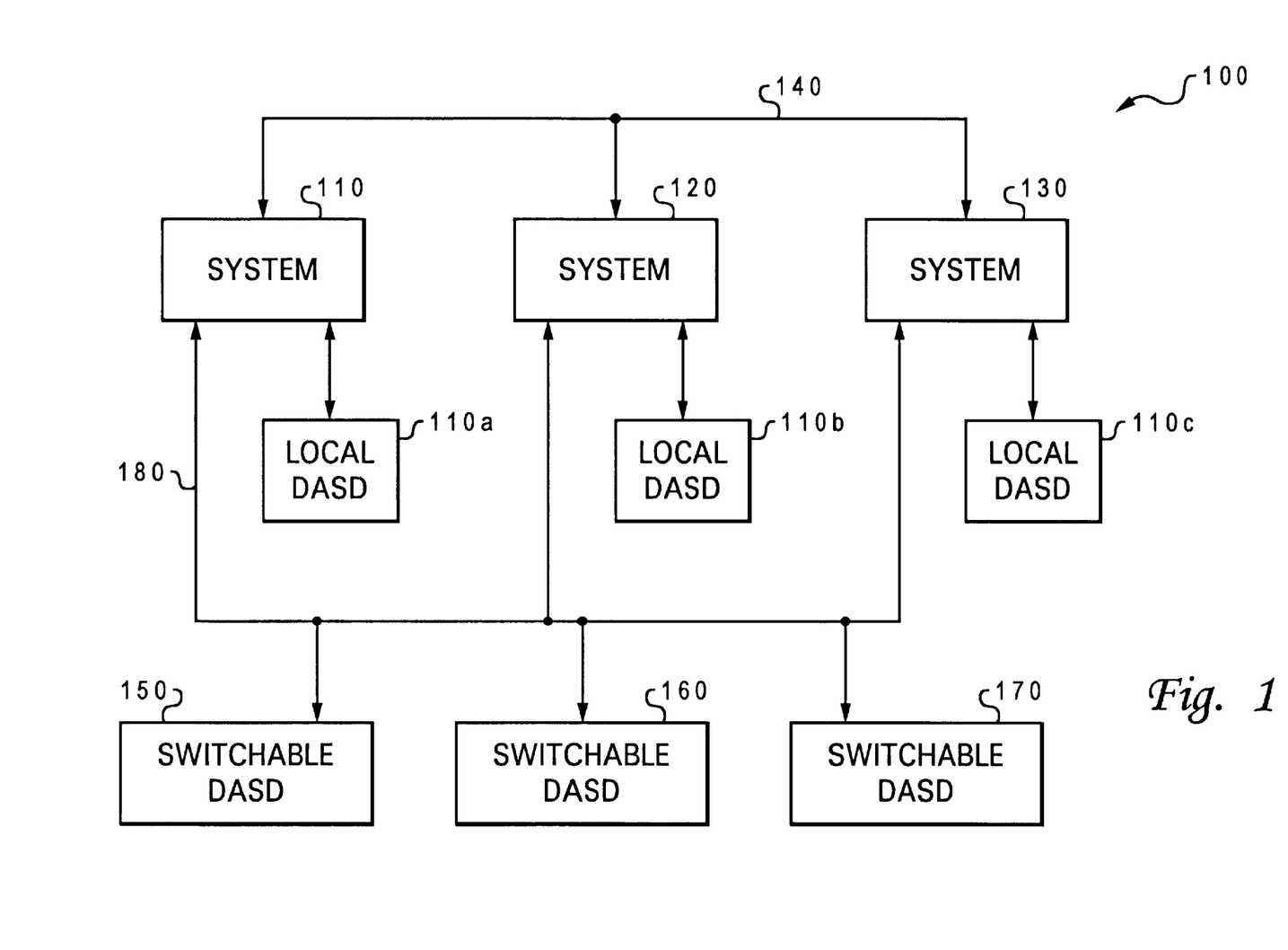
FIG. 1 illustrates an exemplary data processing system that provides a suitable environment for the practice of the present invention.

With reference now to the figures and in particular with reference to FIG. 1, there is depicted an exemplary data processing system 100 that provides a suitable environment for the practice of the present invention. Data processing system 100 includes first, second and third systems (processing units) 110, 120, 130, such as conventional personal computers or workstations, that are coupled together utilizing a system interconnection 140 that provides a means for communication between the systems. Interconnection 140 may be any one of several conventional network connection topologies, such as Ethernet. Also depicted in the illustrative embodiment are first, second and third local data storage devices 110a, 110b, 110c, e.g., conventional hard disk drives, each of which is associated with a corresponding processing unit. First, second and third systems 110, 120, 130 are also coupled via an input/output (I/O) interconnect 180, such as Fibre Channel, to a plurality of switchable direct access storage devices (DASDs), generally designated first, second and third switchable DASDs 150, 160, 170. It should be noted that each of the switchable DASDs may be, in an advantageous embodiment, a redundant array of independent disks (RAID) storage subsystem or, alternatively, a single storage device. In a preferred embodiment, data processing system 100 utilizes a clustering configuration and the switchable DASDs allows data processing system 100 to incur a primary system, e.g., first system 110, failure and still be able to continue running on a backup system, e.g., second system 120, without having to replicate or duplicate DASD data during normal run-time. The switchable DASD is automatically switched, i.e., no movement of cables required, from the failed system to the backup system as part of an automatic or manual failover.

Figure 2:
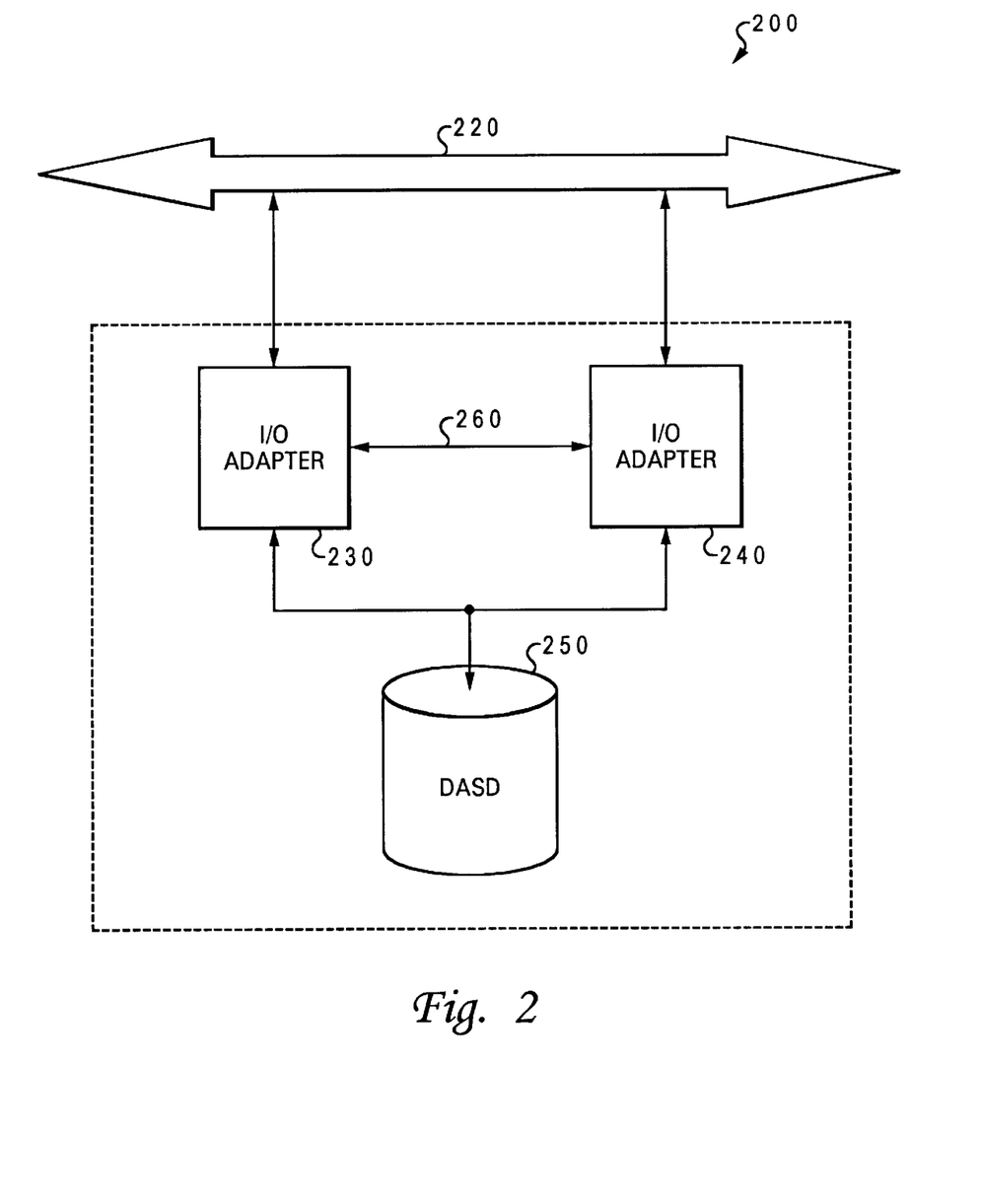
FIG. 2 illustrates a simplified block diagram of an exemplary switchable DASD utilizing an embodiment of a dual storage adapter according to the principles disclosed by the present invention.

Referring now to FIG. 2, there is illustrated a simplified block diagram of an exemplary switchable DASD 200 utilizing an embodiment of a dual storage adapter according to the principles disclosed by the present invention. In the illustrated embodiment, switchable DASD 200 (analogous to first, second or third switchable DASDs 150, 160, 170 in FIG. 1) is shown coupled to an I/O interconnect 220 (analogous to I/O interconnect 180 in FIG. 1). Switchable DASD 200 includes a dual storage adapter having first and second I/O adapters 230, 240 coupled to a storage device 250 that, as discussed above, may be a single storage device or a number of storage devices in a RAID configuration. A dedicated communication link 260, such as a high-speed serial bus, is utilized to provide a means of communication between first and second I/O adapters 230, 240. The operation and construction of an I/O adapter that may be advantageously utilized for first and second I/O adapters 230, 240 will be described in greater detail hereinafter in conjunction with FIG. 3, with continuing reference to FIGS. 1 and 2.

Figure 3:
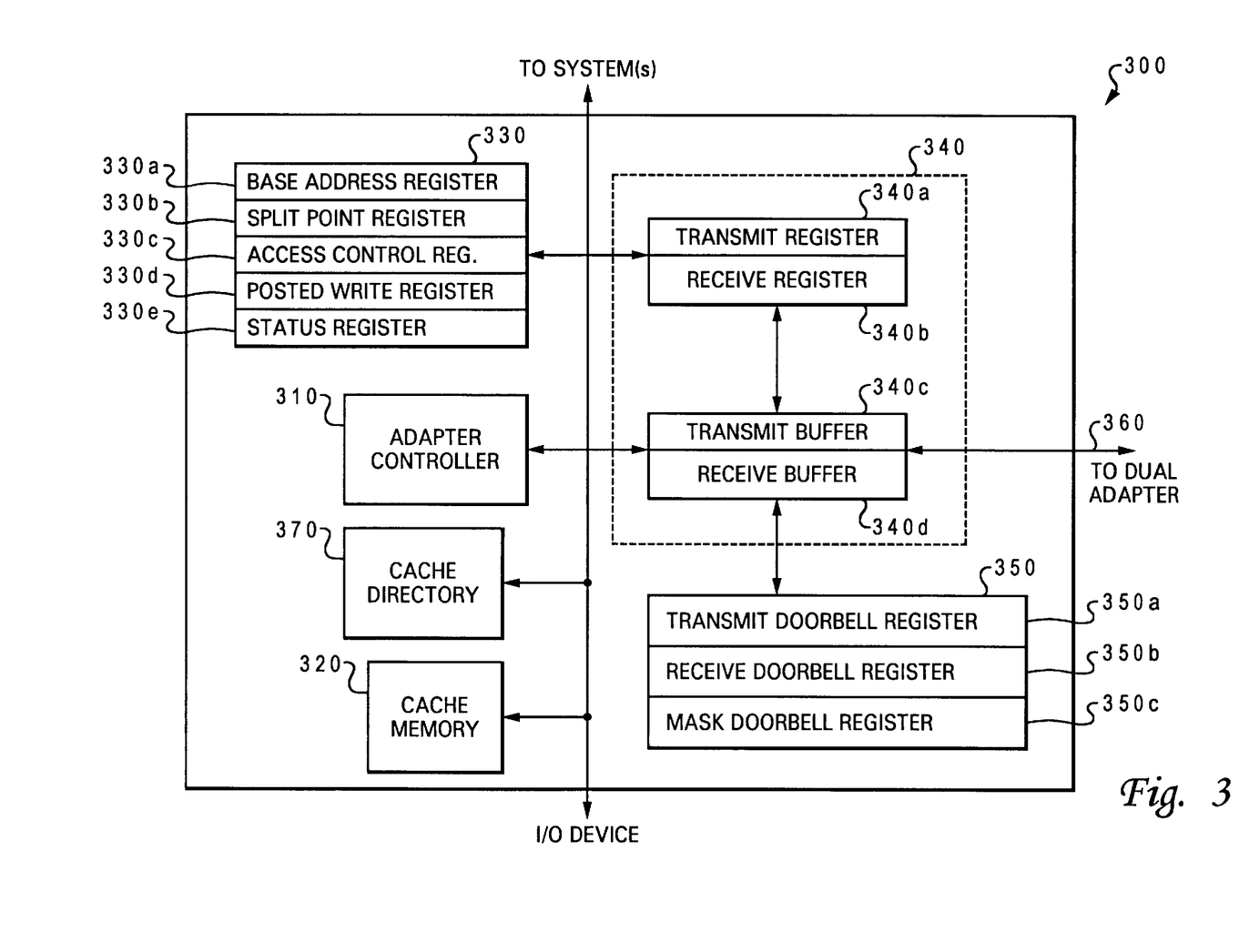
FIG. 3 illustrates a block diagram of an embodiment of an I/O adapter that provides a suitable environment for the practice of the present invention.

Turning now to FIG. 3, there is depicted a block diagram of an embodiment of an I/O adapter 300 according to the present invention. I/O adapter 300 includes an adapter controller 310 that provides the local processing functions coupled to a cache memory 320 and a cache directory 370. A dedicated hardware communication link 360 that, in an advantageous embodiment, is a high-speed serial bus, couples I/O adapter 300 to a second I/O adapter (not shown) in a dual storage adapter configuration (analogous to first and second I/O adapters 230, 240 depicted in FIG. 2). Communication link 360 is utilized to keep the fast write cache directory information in cache directory 370 and data in cache memory 320 mirrored between I/O adapter 300 and a corresponding cache directory and cache memory in the second I/O adapter. Communication link 360 is coupled to a message passing circuit 340 that provides I/O adapter 300 the ability to send and receive data from the second adapter and the means for determining if a message being read at a receiving end has been overlaid with a new incoming message. It should be noted that hardware acknowledgment of the successful transmission of the message is not required, essentially a "send and forget" operation. In the event that the data gets "corrupted" during transmission, the receiving adapter will simply discard the data. A higher-level firmware protocol utilized in I/O adapter 300, for example, may utilize a time-out mechanism to determine if retransmission is required. In the case of a cache data write or a cache directory write from I/O adapter 300 to the second adapter, a pass/fail acknowledgment is required. This acknowledgment is important because the second adapter sends the acknowledgment without invoking or interrupting the firmware running on the second adapter. This communication traffic, i.e., writing a mirror copy of the data and directory to the second adapter, that makes up the majority of the traffic on communication link 360, does not require any firmware resources on the second adapter. This is a synchronized firmware model, since I/O adapter 300 is notified of the successful mirroring of the data in the second adapter. This results in a fast data transfer that requires no firmware support on the second adapter while keeping I/O adapter 300 informed of the success or failure of the mirroring operation, i.e., cache data and cache directory writes.

To accomplish its functional tasks, message passing circuit 340 includes transmit and receive registers 340a, 340b and transmit and receive buffers 340c and 340d. In a preferred embodiment, both transmit and receive buffers 340c, 340d are conventional 128 byte registers that are utilized to buffer an outgoing or an incoming message, respectively. Transmit register 340a is utilized to initiate the sending of a message stored in transmit buffer 340c across communication link 360 to the second adapter. A write to transmit register 340a to set a send bit will initiate the data transfer to the second adapter. The set send bit in transmit register 340a will be cleared when I/O adapter 300 believes that the data has been sent. It should be noted that the successful receipt of the transmitted data will not be provided to I/O adapter 300 from the second adapter. Receive register 340b, in an advantageous embodiment, includes a "dirty" bit and a "message received" bit. Following the receipt of the first byte of an incoming message from the second adapter at I/O adapter 300, the dirty bit will be set. After all of the 128 byte message has been successfully received from the second adapter, the dirty bit is cleared and the message received bit will be set in I/O adapter 300. The message receive bit may also be utilized to interrupt the adapter's firmware to indicate that a message has not been received. The dirty bit will not be reset and the message receive bit will not be set if the full message was not successfully received. In another advantageous embodiment, a mask register (not shown) may be utilized by the adapters to prevent incoming messages from generating an interrupt. An illustrative message passing sequence from I/O adapter 300 to the second adapter is as follows. Initially, the firmware in I/O adapter 300 checks the send bit in transmit register 340a to ensure that there are no messages currently being sent to the second adapter. If the send bit is not set, a 128 byte message is loaded into transmit buffer 340c, following which, the send bit in transmit register 340a is set. Subsequently, the 128 byte message is sent via communication link 360 to a receive buffer in the second adapter and the send bit in transmit register 340a is cleared. Following the receipt of the first byte, a dirty bit in a receive register in the second adapter is set. Upon receiving the full message, the second adapter sets a receive bit in its receive register and concurrently, in the same clock cycle, clears the dirty bit in its receive register. The second adapter then proceeds to clear a message receive bit in an interrupt register (not shown) and copies the message out of its receive buffer. Finally, the second adapter checks the dirty bit and the message receive bit in its receive register to ensure that the message being copied out of its receive buffer was not overlaid with another incoming message. It should be noted that the hardware in the second adapter does not prevent a new message from I/O adapter 300 from overlaying an older message in the receive buffer. It is the responsibility of the implemented firmware in the adapters to control the rate at which it transmits messages to prevent messages from being lost. Any conventional suitable techniques that are well-known in the art may be advantageously employed.

A doorbell circuit 350 is utilized in I/O adapter 300 to provide a means for base low level communication between I/O adapter 300 and the second adapter, i.e., "mirrored" adapter, by supplying the ability to generate interrupts in the mirrored adapter. Doorbell circuit 350 includes a transmit doorbell register 350a, a receive doorbell register 350b and a mask doorbell register 350c. Transmit doorbell register 350a is utilized by I/O adapter 300 to set bits in the second adapter's receive doorbell register active by setting a corresponding bit in transmit doorbell register 350a. The bits in receive doorbell register 350b are set by the second adapter utilizing its transmit doorbell register. It should be noted that both I/O adapter 300 and the second adapter can clear its own receive doorbell register. The bits in receive doorbell register 350*b* can be masked and any unmasked bits that are active can raise an interrupt. Mask doorbell register 350*c* is utilized to mask incoming receive doorbell interrupts from the second adapter. To initiate communication with the second adapter, I/O adapter 300 writes a "value" to a doorbell transmit port (not shown). Following which, this value is transmitted to the second adapter. Upon receipt of the value from I/O adapter 300, the second adapter, in an advantageous embodiment, "ORs" the value into its receive doorbell register. Any resulting unmasked active bit in the second adapter's receive doorbell register will raise an interrupt to the second adapter. It should be noted that no confirmation is returned to I/O adapter 300 from the second adapter following receipt of the value.

I/O adapter 300 also includes a mirroring directory 330 that, in turn, includes a base address register 330*a*, a split point register 330*b*, an access control register 330*c*, a posted write register 330*d* and a status register 330*e*. Mirroring directory 330 is utilized to provide the ability to mirror cache directory writes in I/O adapter 300 to the second adapter and memory partitioning of cache directory 370 between the primary and backup adapter. Mirroring directory 330 also supports positive confirmation that the cache directory data has exited all temporary buffers in the "mirrored" adapter and is resident in a nonvolatile memory and ensures mirrored write ordering since all writes must be executed in the order that they were issued. Write protection of mirrored copy areas is also supported by mirroring directory 330. Base address register 330*a* defines the address location, e.g., in bulk memory, where cache directory 370 will be located. I/O adapter 300, i.e., primary adapter, will automatically mirror writes to this memory region across communication link 360 to the second adapter, i.e., backup adapter. Split point register 330*b* breaks cache directory 370 into two regions; one for cache directory data from the primary adapter and one for cache directory data from the backup adapter. Access control register 330*c* is utilized to define which regions in the allocated cache directory region in memory belong to the primary adapter and to the backup adapter to enable mirroring in the primary region and to provide write protection for both regions. Posted write register 330*d* is utilized to ensure that there is adequate performance and prevent the primary adapter's processor from stalling. Status register 330*e* provides positive confirmation that the mirrored writes from the primary adapter to the backup adapter's nonvolatile memory have been committed. Status register 330*e* contains the number of writes still pending in posted write register 330*d*, the number of acknowledges from the backup adapter that is pending and the error bits for mirror write failures.

With respect to error reporting, all write operations that an adapter issues to its own cache directory will always occur. The following error conditions only blocks those write operations from being mirrored to a backup adapter. (1) Errors that occur during the execution of a mirror of cache directory 370 data to the cache directory in the second adapter utilizing communication link 360 will be reported by I/O adapter 300. The second adapter, in this case, will not report errors to its local processor. (2) Errors occurring when writing from the posted write queue in posted write register 330*d* will be reported utilizing status register 330*e*. No interrupts will be generated as a result of an error on a write from the posted write queue. (3) In the event of an error occurring on a mirror write operation to the cache directory area in the second adapter, all subsequent mirror writes to the second, or backup, adapter will be blocked by I/O adapter 300 and the second adapter. Additionally, all writes that are resident in temporary buffers and in the posted write queue will be discarded. Any writes across communication link 360 from I/O adapter 300 to the second adapter will not be allowed until I/O adapter 300 clears the error condition.

Although not shown, I/O adapter 300 also includes a direct memory access (DMA) device that can be programmed to transfer data from I/O adapter's 300 write cache to the second adapter's write cache. The DMA device is provided with starting and ending addresses for I/O adapter 300 write cache data area and the starting and ending addresses for the second adapter write cache data area. Write protection is provided by the write cache data area memory controller and only data from communication link 360 is allowed write access to the memory region reserved for the backup write cache data area, e.g., see FIG. 4B. Writes received across communication link 360 to memory locations other than those locations reserved for the second adapter are rejected. In the case of errors that occur during the execution of the DMAs to the second adapter's memory locations across communication link 360 will be reported by the adapter that issued the DMA command. The target adapter will not report errors to its local processor and these errors will not prevent the DMAs from continuing, as opposed to memory mapped I/Os (MMIOs) utilized in the cache directory. This allows I/O adapter 300 to have the ability to mirror fast write cache data to the second adapter while having write protection of the mirrored copy memory areas where the memory partitioning of write cache area within cache memory 320 is between I/O adapter 300 and the second adapter, i.e., primary and backup adapters, respectively. It should be noted that support to read the remote copy of a cache data, e.g., I/O adapter 300 cache data mirrored in the second adapter, is not required. Although certain details of I/O adapter 300 have been described and discussed in terms of its function herein above, it should be readily apparent to those skilled in the art that these functionally described mechanisms can be mapped to any suitable physical layer protocol.

Figure 4A:
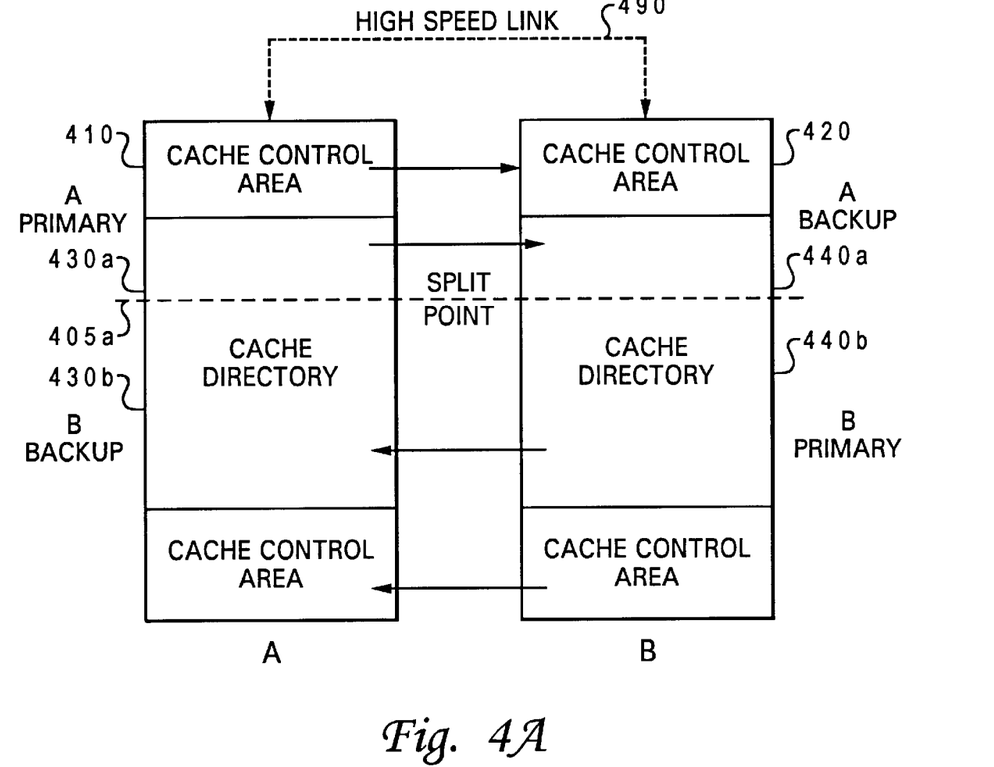
FIG. 4A illustrates a high-level block diagram of an embodiment of a memory layout of a cache directory control area according to the present invention.
Figure 4B:
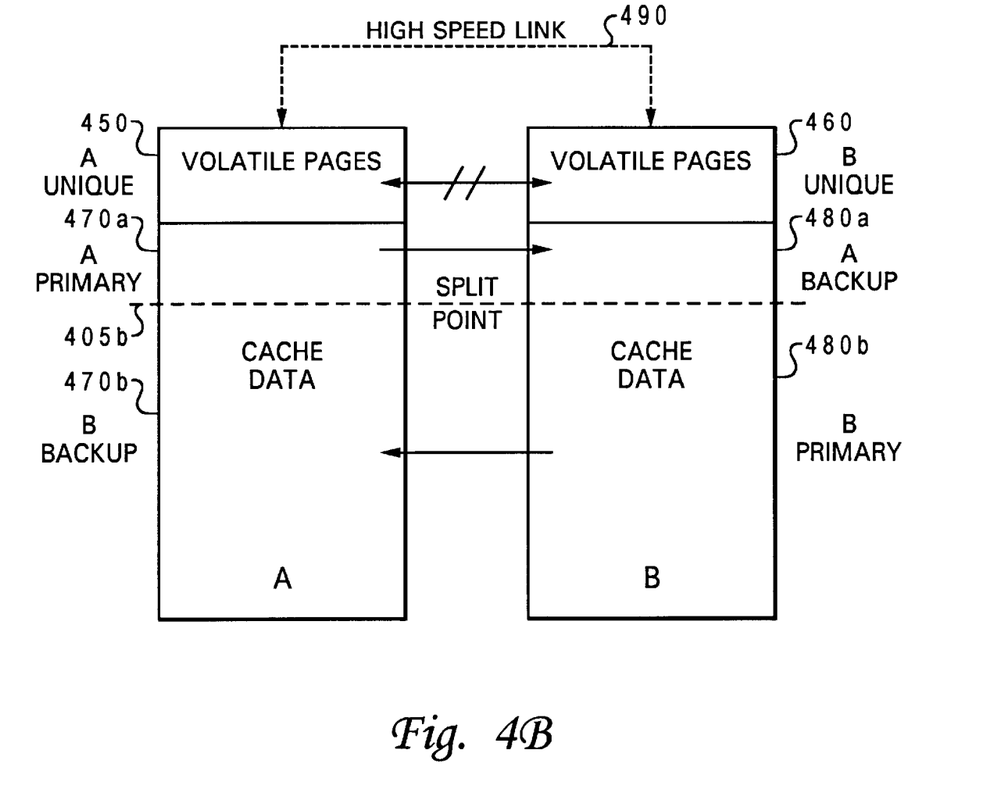
FIG. 4B illustrates a high-level block diagram of an embodiment of a memory layout of a cache data store area according to the present invention.

Referring now to FIGS. 4A and 4B, there are illustrated high-level block diagrams of embodiments of memory layouts of cache directories and cache data store areas according to the principles disclosed by the present invention. As depicted in FIG. 4A, first and second cache directories 410, 420 of primary and secondary, i.e., backup, adapters (analogous to first and second adapters 230, 240 in FIG. 2) communicate with each other utilizing a dedicated communication link 490 that as described previously is a high-speed serial bus in a preferred embodiment. First cache directory 410 (analogous to cache directory 370 in FIG. 3) is typically a conventional non-volatile memory device that includes a first region 430*a* and a second region 430*b* which are separated by a split point 405*a* that is a physical memory location that functions as a boundary. In an advantageous embodiment, split point 405*a* bisects first cache directory 410 in half, although in other advantageous embodiments, the first and second regions 430*a*, 430*b* do not have to be equal in size. In a preferred embodiment, first region 430*a* contains the cache directory information, including cache control information, associated with the primary adapter and second region 430*b* contains the cache directory information, including cache control information, associated with the secondary adapter. Similarly, second cache directory 420 (located at the secondary adapter) includes a first region 440*a* separated from a second region 440*b* by split point 405*a* where first region 440*a* contain cache directory information associated with the primary adapter and second region 440b contain cache directory information pertaining to the secondary adapter. It should be noted that first and second cache directories 410, 420 are preferably the same type of memory device, although compatible memory devices may also be advantageously utilized.

Turning now to FIG. 4B, as shown in the illustrated embodiment, first and second cache data stores 450, 460 of the primary and secondary adapters, respectively, communicate with each other utilizing the dedicated communication link 490. First cache data store 450 (analogous to cache memory 320 in FIG. 3) is typically a conventional non-volatile memory device that includes a first region 470a and a second region 470b that are divided by split point 405b. In an advantageous embodiment, first region 470a contains the write cache data of the primary adapter and second region 470b contains the cache data associated with the secondary adapter. Similarly, second cache data store 460 (located at the secondary adapter) includes a first region 480a separated from a second region 480b by split point 405b, where first region 480a contain cache data associated with the primary adapter and second region 480b contain cache data associated with the secondary adapter. It should be noted that first and second cache data stores 450, 460 are preferably the same type of memory device, although compatible memory devices may also be advantageously utilized.

Figure 5:
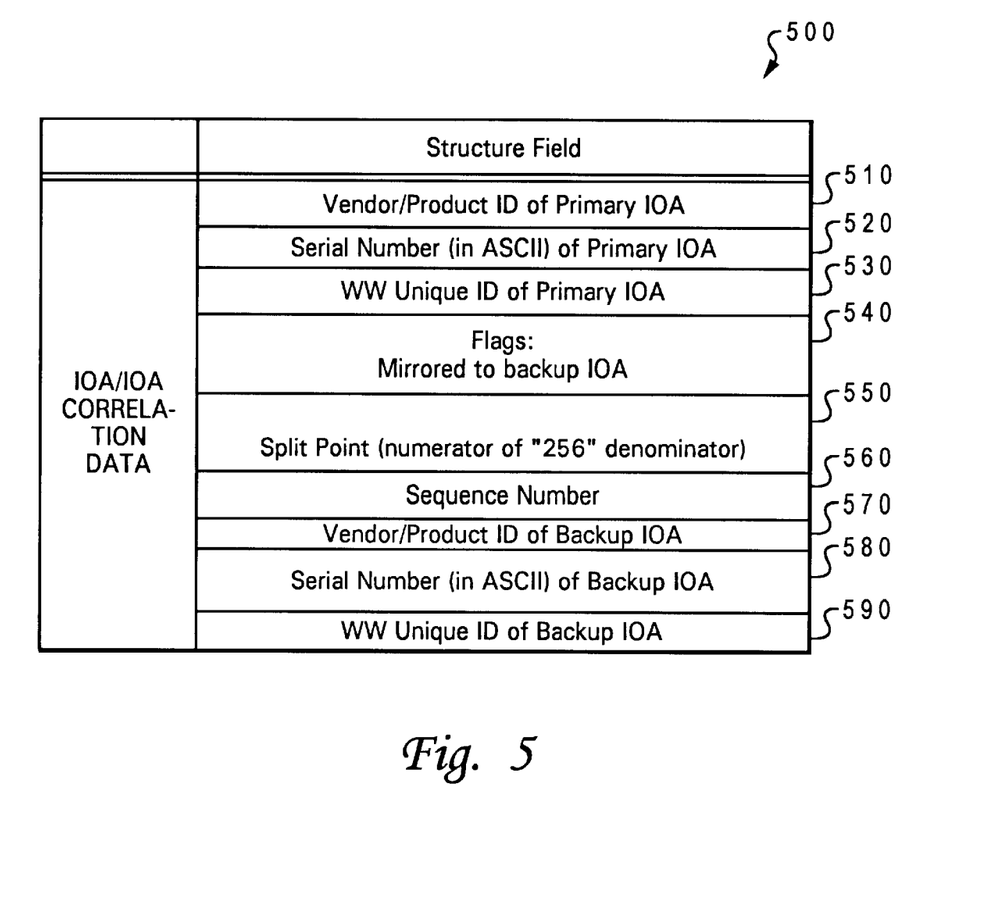
FIG. 5 illustrates an embodiment of an adapter to adapter correlation data control block according to the principles disclosed by the present invention.

Referring now to FIG. 5, there is depicted an embodiment of an adapter to adapter correlation data control block 500 according to the principles disclosed by the present invention. Correlation data control block 500 in an advantageous embodiment, is resident in a non-volatile memory of an adapter. For example, each of the primary and secondary adapters, such as first and second I/O adapters 230, 240, will have a copy of the correlation data in a resident non-volatile random access memory (NVRAM). The correlation data correlates the data in the primary and secondary adapters NVRAMs and is utilized to ensure data coherency between the primary and secondary adapters. Correlation data control block 500 incorporates a data structure that includes a vendor/product identifier of the primary adapter 510 field, a serial number of the primary adapter 520 field and a world-wide unique identifier of the primary adapter 530 field that are utilized to identify the primary adapter. Information related to the secondary adapter is also included in correlation data block 500 to distinguish the secondary adapter from the primary adapter and includes a vendor/product identifier of the secondary adapter 570 field, a serial number of the secondary adapter 580 field and a world-wide unique identifier of the primary adapter 590 field.

Correlation data control block 500 also includes a flag 540 field that provides a means for indicating whether data in the primary adapter's nonvolatile write cache has been mirrored to the secondary adapter. In an advantageous embodiment, flag 540 is a single bit that is set when the primary adapter's write cache data has been mirrored to the secondary adapter. A split point 550 field and a sequence number 560 field are also included in correlation data control block 500 to contain data representing the split point information, such as the ratio of the cache memory and cache directory memory devices allocated to the primary and secondary adapters, and number of times a synchronization process, which will be described in greater detail hereinafter, has been performed, respectively.

Figure 6:
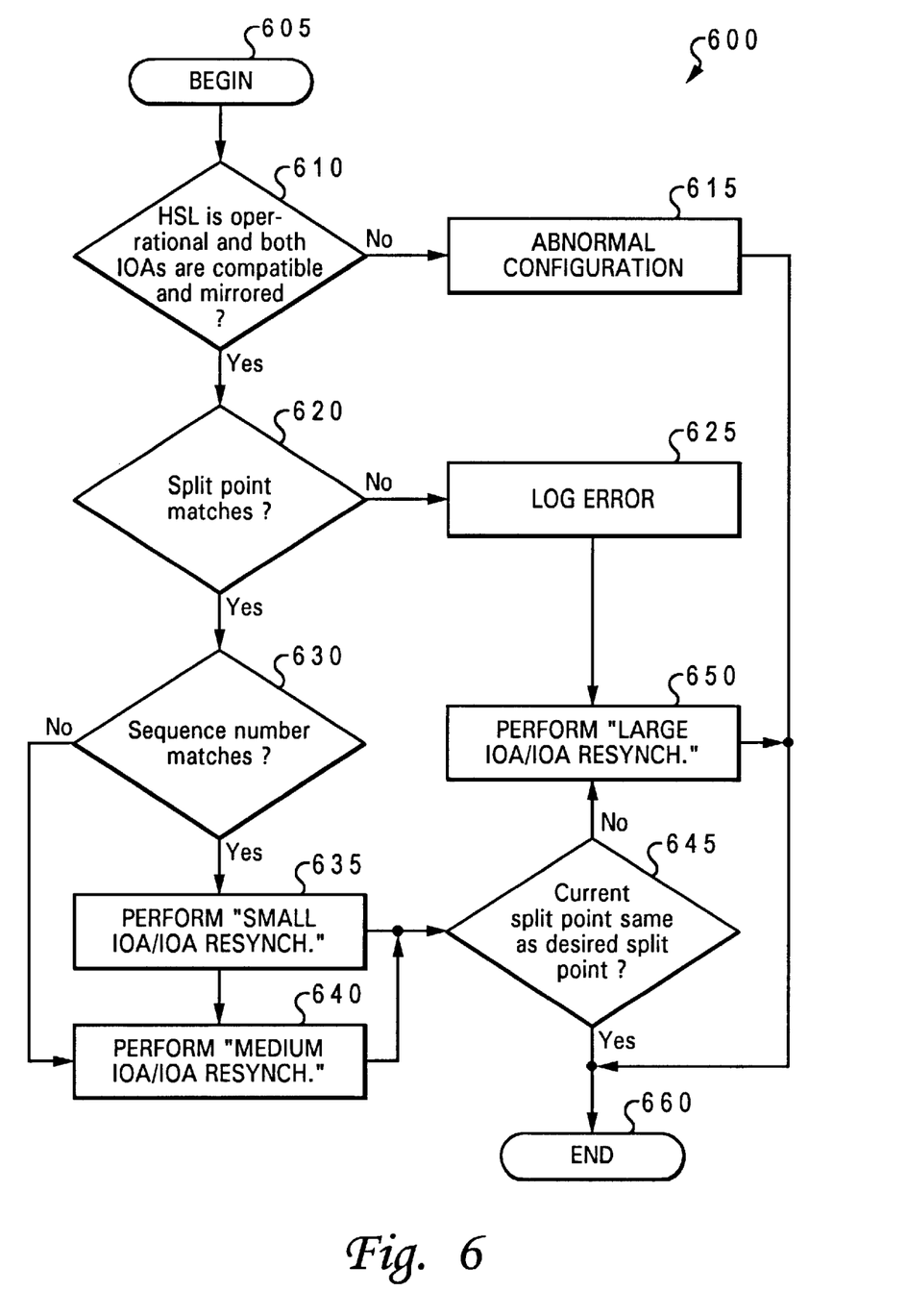
FIG. 6 illustrates a high-level process flow of an embodiment of a synchronization process according to the present invention.

Referring now to FIG. 6, there is illustrated a high-level process flow of an embodiment of a synchronization process 600 according to the present invention. Synchronization process 600 is initiated, as depicted in step 605, for example, when primary and secondary adapters (IOAs) are activated, i.e., powered up. It is assumed that ownership of an attached storage device has already been established. In this case, primary ownership of the attached storage device belongs to the primary adapter with the secondary adapter providing the backup, i.e., redundant, mode. Following which, as illustrated in decisional step 610, the high speed communication link (HSL) between the primary and secondary adapters are tested and a communication link is established between the adapters. The compatibility of the primary and secondary adapters and that the primary and secondary are mirrored are also verified to ensure that the synchronization process can be successfully accomplished. Verification of compatibility is accomplished by the primary and secondary adapters exchanging compatibility information located in the correlation data files of the primary and secondary adapters. Similarly, the mirrored flag in the correlation data file is also evaluated to determine if the primary and secondary adapters are mirrored. In the event that the communication link is non-operational, the primary and secondary adapters are not compatible or mirrored, the condition is reported as an abnormal configuration and the sequence number in the correlation data file is incremented, as illustrated in step 615, following which, process 600 terminates at step 660.

On the other hand, if the communication link is operational and the primary and secondary adapters are compatible and mirrored, process 600 proceeds to determine, as depicted in decisional step 620, if the split point in both the primary and secondary adapters matches. If the split points do not match, an error is logged as illustrated in step 625 and process 600 proceeds to perform a "large" adapter to adapter re-synchronization, as depicted in step 650. The large adapter to adapter re- synchronization process will be described in greater detail hereinafter in conjunction with FIG. 8.

If the split points of the primary and secondary adapters matches, the sequence number associated with each adapter and located in their respective correlation data file are compared, as illustrated in decisional step 630. If the sequence number matches indicating that the cache data are mirrored in both adapters, process 600 proceeds to perform a "small" adapter to adapter re-synchronization, as depicted in step 635, where the primary adapter's cache directory information is copied to the secondary adapter. However, if it is determined that the spilt points do not match, process 600 proceeds to perform a "medium" adapter to adapter re-synchronization as illustrated in step 640, where cache data in addition to cache directory information in the primary adapter is copied over to the secondary adapter. The small and medium re-synchronization will be described in greater detail with reference to FIG. 7.

Following a small or medium re-synchronization, process 600 determines if the current split point is the desired split point as depicted in decisional step 645. Typically, in a preferred embodiment, the spilt point is 50/50, i.e., the cache directory and cache data store memories are divided in equal parts, however, the division of the memory allocated to the primary and to the secondary adapter cache directory and data store information may be varied depending on the application. If it is determined that current split point is not the desired value, process 600 proceeds to perform a larger adapter to adapter re-synchronization, as illustrated in step 650, following which process 600 terminates at step 660. If, on the other hand, it is determined at decisional step 645 that the split point is at the desired value, process 600 terminates at step 660.

Figure 7:
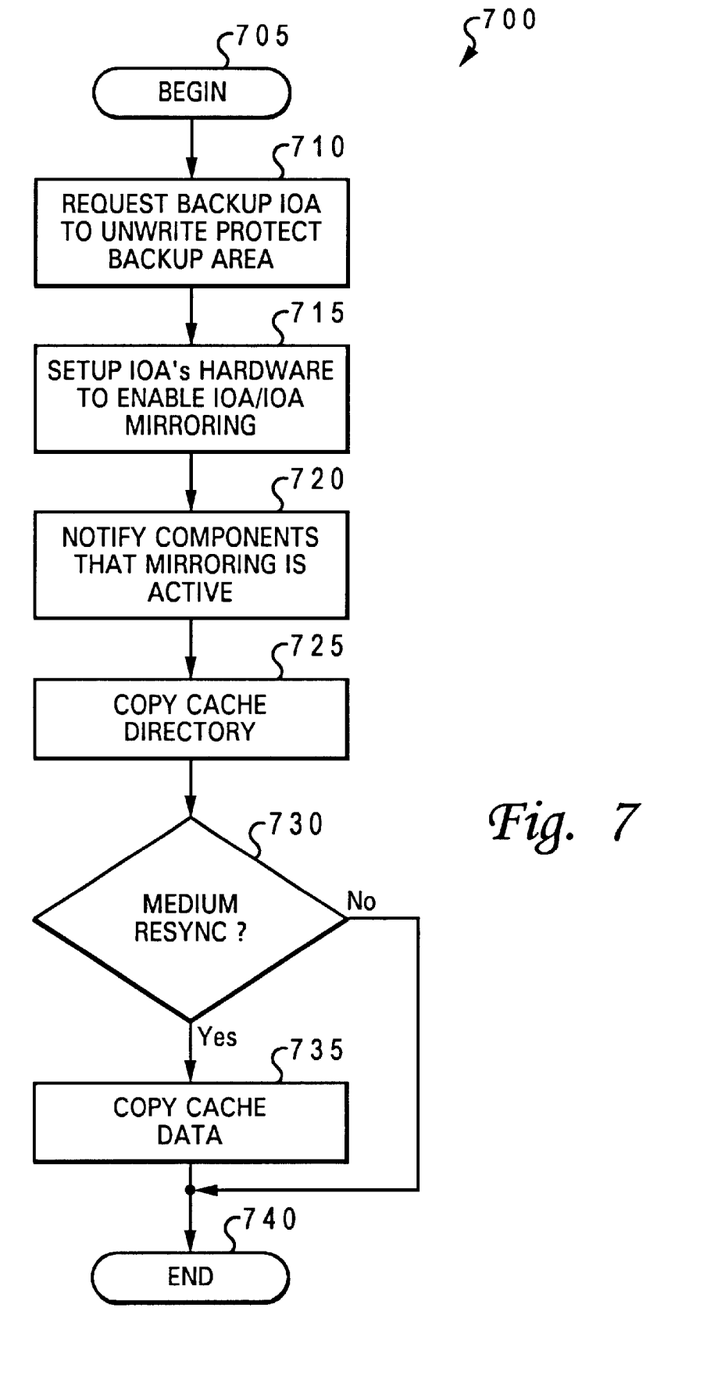
FIG. 7 illustrates a high-level process flow of an embodiment of a small/medium re-synchronization process according to the present invention.

Turning now to FIG. 7, there is depicted a high-level process flow of an embodiment of a small/medium re-synchronization process 700 according to the present invention. Process 700 is initiated, as illustrated in step 705, for example, following the determination of whether the sequence numbers matches as discussed above in decisional step 630. Next, a request is sent the secondary, or backup, adapter to remove the "write" protection on its backup area, the region in its cache data and cache directory memory areas assigned to storing the primary adapter cache data and directory information, as depicted in step 710. It should be noted that for ease of explanation, the following illustration of a re-synchronization process will be described in the context of updating, or mirroring, in the secondary adapter utilizing data resident in the primary adapter. The re-synchronization process can also be accomplished in the opposite direction, data in the secondary adapter mirrored to the primary adapter which may be required in the event that of a failure in the primary adapter. The primary and secondary adapters hardware are next configured, as illustrated in step 715, to enable the mirroring operation that includes setting up the split point. It should be noted that the write protection of the primary adapter non- volatile data memory is not affected and remains in place.

After the primary and secondary adapters have been configured for the mirroring operation, process 700 notifies all the necessary components, such as the adapter controller, that the mirroring operation is active to indicate that future write operations must be mirrored to the backup adapter, as depicted in step 720. It should be noted that "mirroring enabled" is also set and, in a preferred embodiment, a mirroring enabled bit is set to indicate that mirroring is enabled. Next, as illustrated in step 725, the cache directory in the primary adapter is copied to the secondary adapter. After mirroring the cache directory, process 700 proceeds to determine, as illustrated in decisional step 730, whether a medium re-synchronization was requested. If a medium re-synchronization is desired, e.g., sequence numbers did not match in decisional step 630, process 700 also proceeds to copy the cache data in the primary adapter to the secondary adapter, as depicted in step 735. After mirroring the cache data from the primary adapter over to the secondary adapter or following the determination that a medium re-synchronization was not requested, process 700 terminates, as illustrated in step 740.

Figure 8:
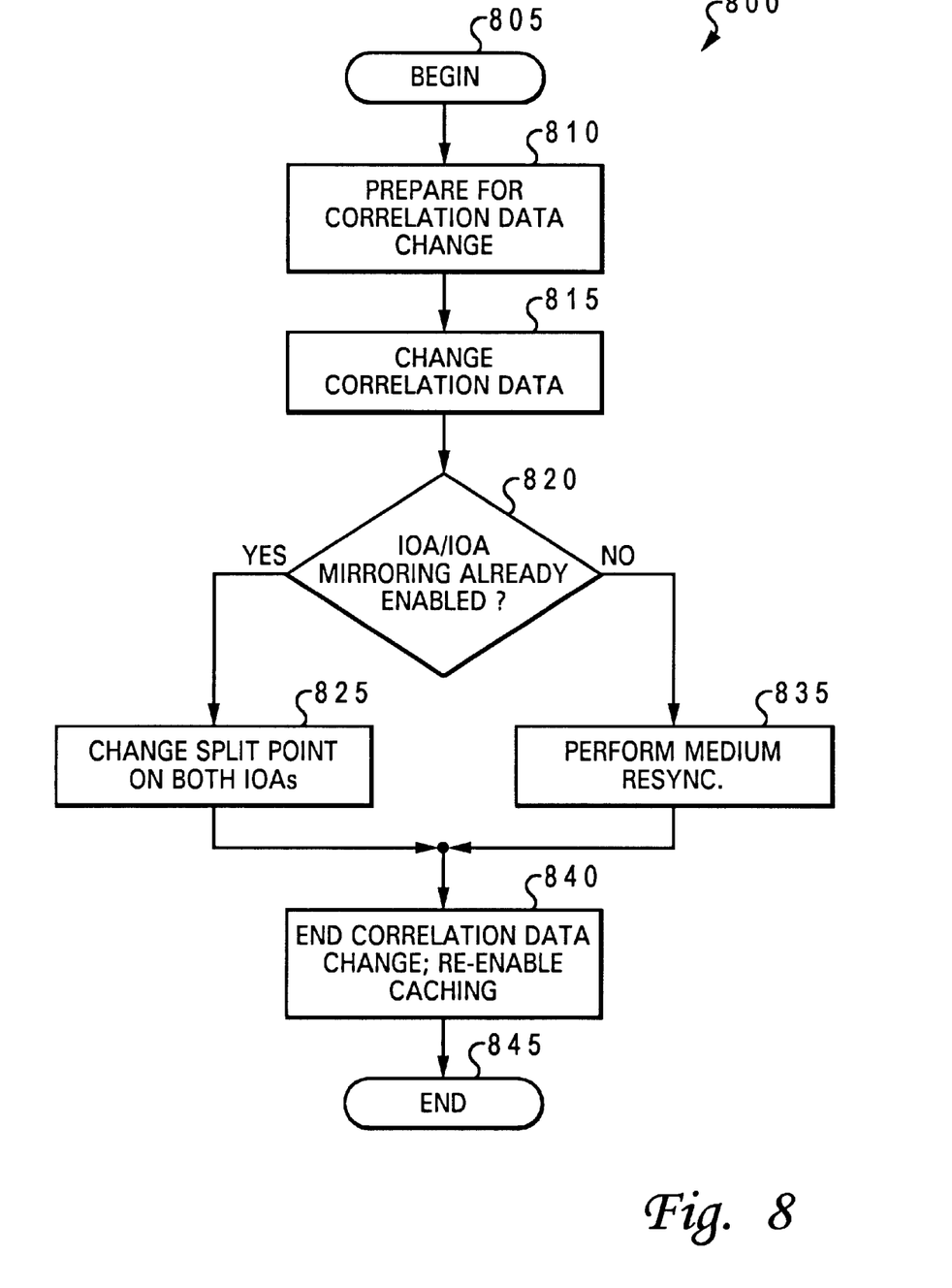
FIG. 8 illustrates a high-level process flow of an embodiment of a large re-synchronization process according to the present invention.

Referring now to FIG. 8, there is illustrated a high-level process flow of an embodiment of a large re-synchronization process 800 according to the present invention. As with small/medium re-synchronization process 700, it should be noted that for ease of explanation, the following illustration of a large re-synchronization process will be described in the context of updating, or mirroring, in the secondary adapter utilizing data resident in the primary adapter. Large re-synchronization process 800 can also be accomplished in the opposite direction, i.e., data in the secondary adapter mirrored to the primary adapter. Process 800 is initiated, as depicted in step 805, following, for example, a failure or an initial power-up. Next, as illustrated in step 810, the primary and secondary adapters prepare for a correlation data change. Preparation for a correlation data change includes flushing and disabling the cache on the primary, or alternatively the secondary, adapter and directing the other adapter to flush and disable its cache. It should be noted that a volatile indication, e.g., a flag, is also set to indicate that a large re-synchronization is in progress so that caching cannot be accidentally restarted during the re-synchronization process. Following the preparation for the correlation data change, the correlation data is changed, as depicted in step 815. Changing the correlation data includes deciding on the split point and cache control area and committing the primary and secondary adapters to the new configuration. After changing the correlation data, process 800 proceeds to determine, as illustrated in decisional step 820, whether adapter to adapter mirroring has been enabled. If it is determined that mirroring has been enabled, the split point in the primary and secondary adapters is changed, as depicted in step 825, and process 800 proceeds to step 840. However, if it is determined that mirroring is not enabled at decisional step 820, process 800 proceeds to step 835.

As illustrated in step 835, if process 800 determines that mirroring has not been enabled, process 800 proceeds to perform a medium re-synchronization where the necessary setup is performed to begin mirroring from the primary to the secondary adapter. Following which, process 800 completes the correlation data change by enabling caching in both the primary and secondary adapters, as depicted in step 840. Following the enabling of caching, process 800 terminates its operation, as illustrated in step 845, by resetting the volatile indication that a large re-synchronization process is in progress.

In an advantageous embodiment, the method for maintaining data coherency and synchronization of the primary and secondary adapters disclosed by the present invention is implemented as a computer executable software program utilized by the primary and/or secondary adapters. As depicted in FIG. 3, the present invention may be implemented within an exemplary I/O adapter or a data processing unit, e.g., first, second or third system 110, 120, 130 that may be embodied as a computer workstation platform, such as IBM's RS/6000, AS/400 or eSeries server. It should be noted that although the present invention has been described, in one embodiment, in the context of an I/O adapter or computer workstation, those skilled in the art will readily appreciate that the present invention described herein-above may be implemented, for example, by other suitable electronic module to execute a corresponding sequence of machine-readable instructions. These instructions may reside in various types of signal-bearing media. In this respect, one aspect of the present invention concerns a programmed product, that includes signal-bearing media tangibly embodying a program of machine-readable instructions executable by a digital data processor to perform the process for maintaining data coherency and synchronization described above. The present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links and wireless.

While the invention has been particularly shown and described with reference to a preferred embodiment, it will be understood by those skilled in the art that various changes in form and detail may be made therein without departing from the spirit and scope of the invention.

What is claimed is:

1. A method for maintaining data coherency in a dual Input/Output(I/O) adapter having primary and secondary adapters, wherein each of the primary and secondary adapters includes resident write cache data and directory storage devices, the method comprising:

utilizing a split point to separate each of the cache data and directory storage devices into first and second regions, wherein the first regions in the primary adapter cache data and directory storage devices contain the primary adapter cache data and directory information, respectively, and the second regions in the primary adapter cache data and directory storage devices contain the secondary adapter cache data and directory information, respectively; and mirroring information stored in the primary adapter cache data and directory storage devices into the secondary adapter cache data and storage devices, wherein the first regions in the secondary adapter cache data and directory storage devices contain the primary adapter cache data and directory information, respectively, and the second regions in the secondary adapter cache data and directory storage devices contain the secondary adapter cache data and directory information, respectively.

2. The method as recited in claim 1, wherein the first and second regions are substantially identical in size.

3. The method as recited in claim 1, wherein the mirroring of information stored in the primary adapter cache data and directory storage devices into the secondary adapter cache data and storage devices includes utilizing a dedicated communication link between the primary and secondary adapters.

4. The method as recited in claim 3, wherein the dedicated communication link is a high-speed serial bus.

5. The method as recited in claim 1, further comprising writing correlation data to the primary and secondary adapters nonvolatile memory devices.

6. The method as recited in claim 5, wherein the correlation data includes:

the primary and secondary adapters unique identifiers;

a flag indicating that the primary adapter's nonvolatile write cache data has been mirrored to the secondary adapter; and the primary and secondary adapters cache data and directory split point information.

7. The method as recited in claim 6, wherein the correlation data further includes product and serial numbers of the primary and secondary adapters.

8. The method as recited in claim 6, wherein the flag is a single bit that is set when the primary adapter's write cache data has been mirrored to the secondary adapter.

9. The method as recited in claim 6, wherein the unique identifiers are world-wide unique identifiers of the primary and secondary adapters.

10. A dual Input/Output (I/O) adapter, comprising:

a primary adapter having resident write cache data and directory storage devices;

a secondary adapter having resident write cache data and directory storage devices;

means for separating each of the cache data and directory storage devices into first and second regions, wherein the first regions in the primary adapter cache data and directory storage devices contain the primary adapter cache data and directory information, respectively, and the second regions in the primary adapter cache data and directory storage devices contain the secondary adapter cache data and directory information, respectively; and means for mirroring information stored in the primary adapter cache data and directory storage devices into the secondary adapter cache data and storage devices, wherein the first regions in the secondary adapter cache data and directory storage devices contain the primary adapter cache data and directory information, respectively, and the second regions in the secondary adapter cache data and directory storage devices contain the secondary adapter cache data and directory information, respectively.

11. The dual I/O adapter as recited in claim 10, further comprising a dedicated communication link between the primary and secondary adapters.

12. The dual I/O adapter as recited in claim 11, wherein the dedicated communication link is a high-speed serial bus.

13. The dual I/O adapter as recited in claim 10, wherein the first and second regions are substantially identical in size.

14. A computer program product, comprising:

a computer-readable medium having stored thereon computer executable instructions for implementing a method for maintaining data coherency in a dual Input/Output(I/O) adapter having primary and secondary adapters, wherein each of the primary and secondary adapters includes resident write cache data and directory storage devices, the computer executable instructions when executed perform the steps of:

separating each of the cache data and directory storage devices into first and second regions, wherein the first regions in the primary adapter cache data and directory storage devices contain the primary adapter cache data and directory information, respectively, and the second regions in the primary adapter cache data and directory storage devices contain the secondary adapter cache data and directory information, respectively; and mirroring information stored in the primary adapter cache data and directory storage devices into the secondary adapter cache data and storage devices, wherein the first regions in the secondary adapter cache data and directory storage devices contain the primary adapter cache data and directory information, respectively, and the second regions in the secondary adapter cache data and directory storage devices contain the secondary adapter cache data and directory information, respectively.

15. The computer program product as recited in claim 14, wherein the separating each of the cache data and directory storage devices into first and second regions includes utilizing a split point.

16. The computer program product as recited in claim 14, wherein the first and second regions are substantially identical in size.

17. The computer program product as recited in claim 14, wherein the mirroring of information stored in the primary adapter cache data and directory storage devices into the secondary adapter cache data and storage devices includes utilizing a dedicated communication link between the primary and secondary adapters.

18. The computer program product as recited in claim 17, wherein the dedicated communication link is a high-speed serial bus.

19. The computer program product as recited in claim 14, further comprising writing correlation data to the primary and secondary adapters nonvolatile memory devices.

20. The computer program product as recited in claim 19, wherein the correlation data includes:

the primary and secondary adapters unique identifiers;

a flag indicating that the primary adapter's nonvolatile write cache data has been mirrored to the secondary adapter; and the primary and secondary adapters c ache data and directory split point information.

21. The computer program product as recited in claim 20, wherein the correlation data further includes product and serial numbers of the primary and secondary adapters.

22. The computer program product as recited in claim 20, wherein the flag is a single bit that is set when the primary adapter's write cache data has been mirrored to the secondary adapter.

23. The computer program product as recited in claim 20, wherein the unique identifiers are world-wide unique identifiers of the primary and secondary adapters.

24. A computer-readable medium having stored thereon a data structure for correlating write cache data between primary and secondary adapters, the data structure comprising:

a first field containing data representing a unique identifier of the primary adapter;

a second field containing data representing a unique identifier of the secondary adapter;

a third field containing data indicating that the primary adapter's nonvolatile write cache data has been mirrored to the secondary adapter;

a fourth field containing data representing a split point of the primary and secondary adapters write cache data and directory memory layout.

25. The computer-readable medium as recited in claim 24, wherein the unique identifiers of the primary and secondary adapters are the world-wide unique identifiers of the primary and secondary adapters.

26. The computer-readable medium as recited in claim 24, wherein the third field includes a single bit, the bit is set when the primary adapter's write cache data has been mirrored to the secondary adapter.

27. The computer-readable medium as recited in claim 24, wherein the data structure further including:

a fifth field containing data representing a product identifier of the primary adapter; and a sixth field containing data representing a serial number of the primary adapter.

28. The computer-readable medium as recited in claim 27, wherein the data structure further including:

a seventh field containing data representing a product identifier of the secondary adapter; and an eight field containing data representing a serial number of the secondary adapter.

29. The computer-readable medium as recited in claim 28, wherein the data structure further comprises a ninth field containing data representing a sequence number.

30. A method for synchronizing primary and secondary Input/Output (I/O) adapters in a dual storage adapter having a dedicated communication link between the primary and secondary adapters, comprising:

determining if the dedicated communication link is operational and the primary and secondary adapters are compatible;

determining if split points in the primary and secondary cache data and directory memory devices match in response to the determination that the dedicated communication link is operational and the primary and secondary adapters are compatible, otherwise indicating that an abnormal configuration is encountered; and in response to the determination that the split points matches, performing a small/medium primary to secondary re-synchronization operation, otherwise performing a large primary to secondary re-synchronization operation.

31. The method as recited in claim 30, wherein in response to the determination that the split points do not match further includes logging an error condition.

32. The method as recited in claim 30, wherein the performing a small/medium primary to secondary re-synchronization operation includes:

determining if sequence number matches; and performing a small primary to secondary re-synchronization operation in response to the determination that sequence number matches, otherwise performing a medium primary to secondary re-synchronization operation.

33. The method as recited in claim 32, wherein the performing a small primary to secondary re-synchronization operation includes copying information in the primary adapter's cache directory to the secondary adapter's cache directory.

34. The method as recited in claim 32, wherein the performing a medium primary to secondary re-synchronization operation includes:

copying information in the primary adapter's cache directory to the secondary adapter's cache directory; and copying cache data in the primary adapter to the secondary adapter.

35. The method as recited in claim 30, wherein the performing a large primary to secondary re-synchronization operation includes:

changing correlation data;

determining if primary to secondary mirroring is enabled;

changing split points on the primary and secondary adapters in response to determination that mirroring is enabled; and performing a medium re-synchronization operation in response to the determination that mirroring is not enabled.

36. A computer program product, comprising:

a computer-readable medium having stored thereon computer executable instructions for implementing a method for synchronizing primary and secondary Input/Output (I/O) adapters in a dual storage adapter having a dedicated communication link between the primary and secondary adapters, the computer executable instructions when executed perform the steps of:

determining if the dedicated communication link is operational and the primary and secondary adapters are compatible;

determining if split points in the primary and secondary cache data and directory memory devices match in response to the determination that the dedicated communication link is operational and the primary and secondary adapters are compatible, otherwise indicating that an abnormal configuration is encountered; and in response to the determination that the split points matches, performing a small/medium primary to secondary re-synchronization operation, otherwise performing a large primary to secondary re-synchronization operation.

37. The method as recited in claim 36, wherein in response to the determination that the split points do not match further includes logging an error condition.

38. The method as recited in claim 36, wherein the performing a small/medium primary to secondary re-synchronization operation includes:

determining if sequence number matches; and performing a small primary to secondary re-synchronization operation in response to the determination that sequence number matches, otherwise performing a medium primary to secondary re-synchronization operation.

39. The method as recited in claim 38, wherein the performing a small primary to secondary re-synchronization operation includes copying information in the primary adapter's cache directory to the secondary adapter's cache directory.

40. The method as recited in claim 38, wherein the performing a medium primary to secondary re-synchronization operation includes:
   copying information in the primary adapter's cache directory to the secondary adapter's cache directory; and
   copying cache data in the primary adapter to the secondary adapter.

41. The method as recited in claim 36, wherein the performing a large primary to secondary re-synchronization operation includes:
   changing correlation data;
   determining if primary to secondary mirroring is enabled;
   changing split points on the primary and secondary adapters in response to determination that mirroring is enabled; and
   performing a medium re-synchronization operation in response to the determination that mirroring is not enabled.

* * * * *